H. OSTROVSKY.
APPARATUS FOR USE BY MUSICIANS FOR PROMOTING THE FLEXIBILITY OF THE JOINTS AND STRETCHING THE MUSCLES AND LIGAMENTS OF THE HANDS.
APPLICATION FILED JULY 19, 1916.
1,250,636.
Patented Dec. 18, 1917.
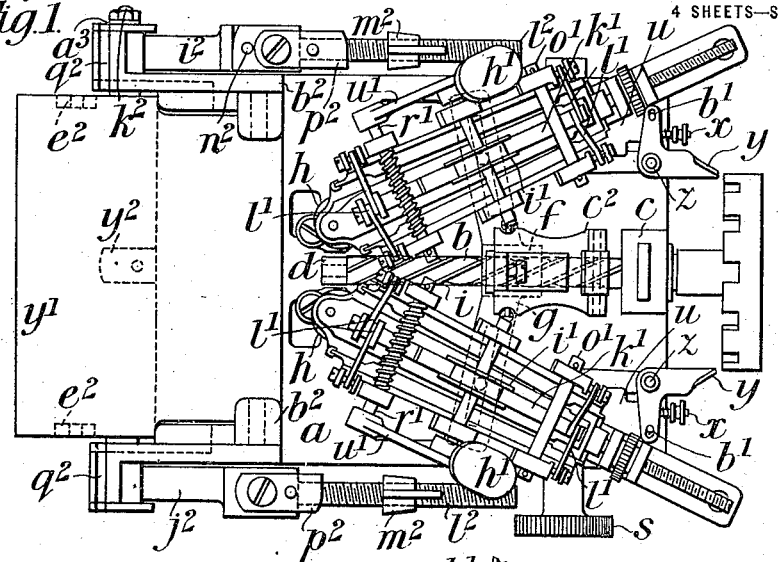
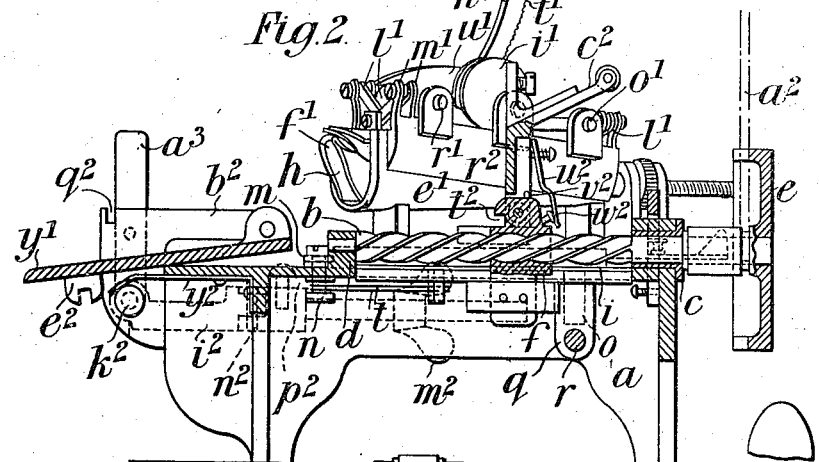
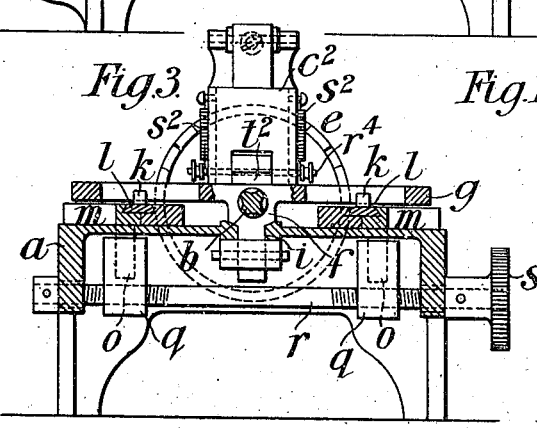

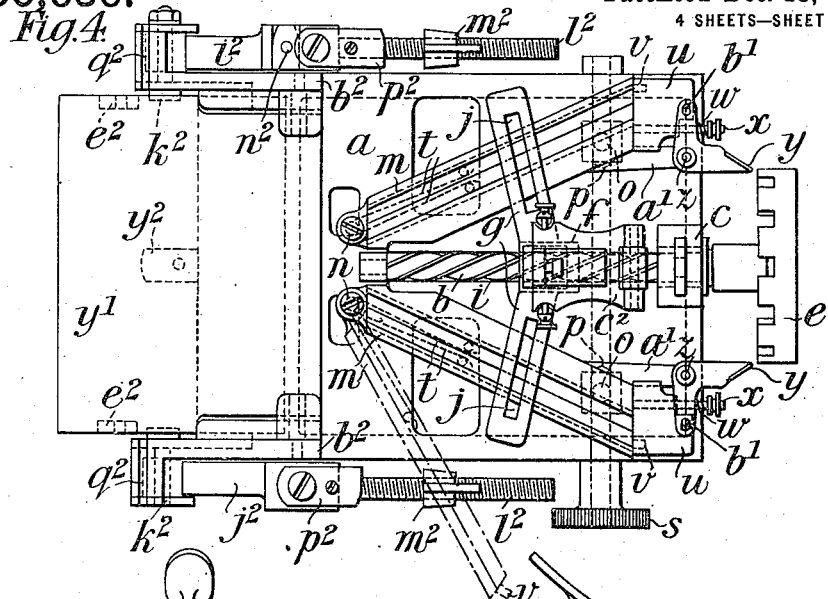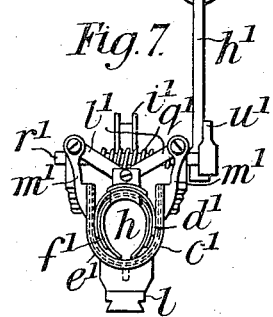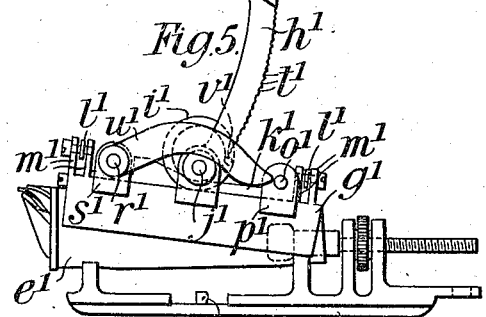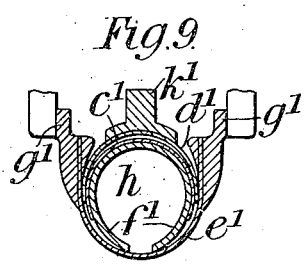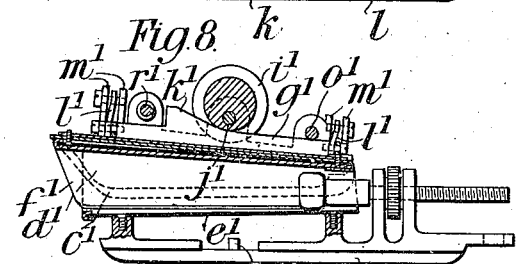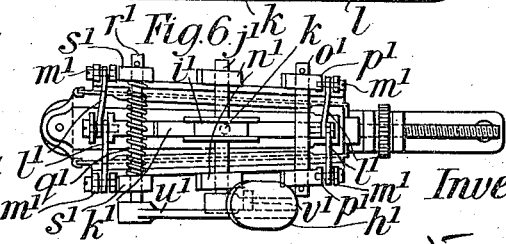

H. OSTROVSKY.
APPARATUS FOR USE BY MUSICIANS FOR PROMOTING THE FLEXIBILITY OF THE JOINTS AND STRETCHING THE MUSCLES AND LIGAMENTS OF THE HANDS.
APPLICATION FILED JULY 19, 1916.

1,250,636.

Patented Dec. 18, 1917.
4 SHEETS—SHEET 3.

Witnesses.

Inventor.
Harry Ostrovsky

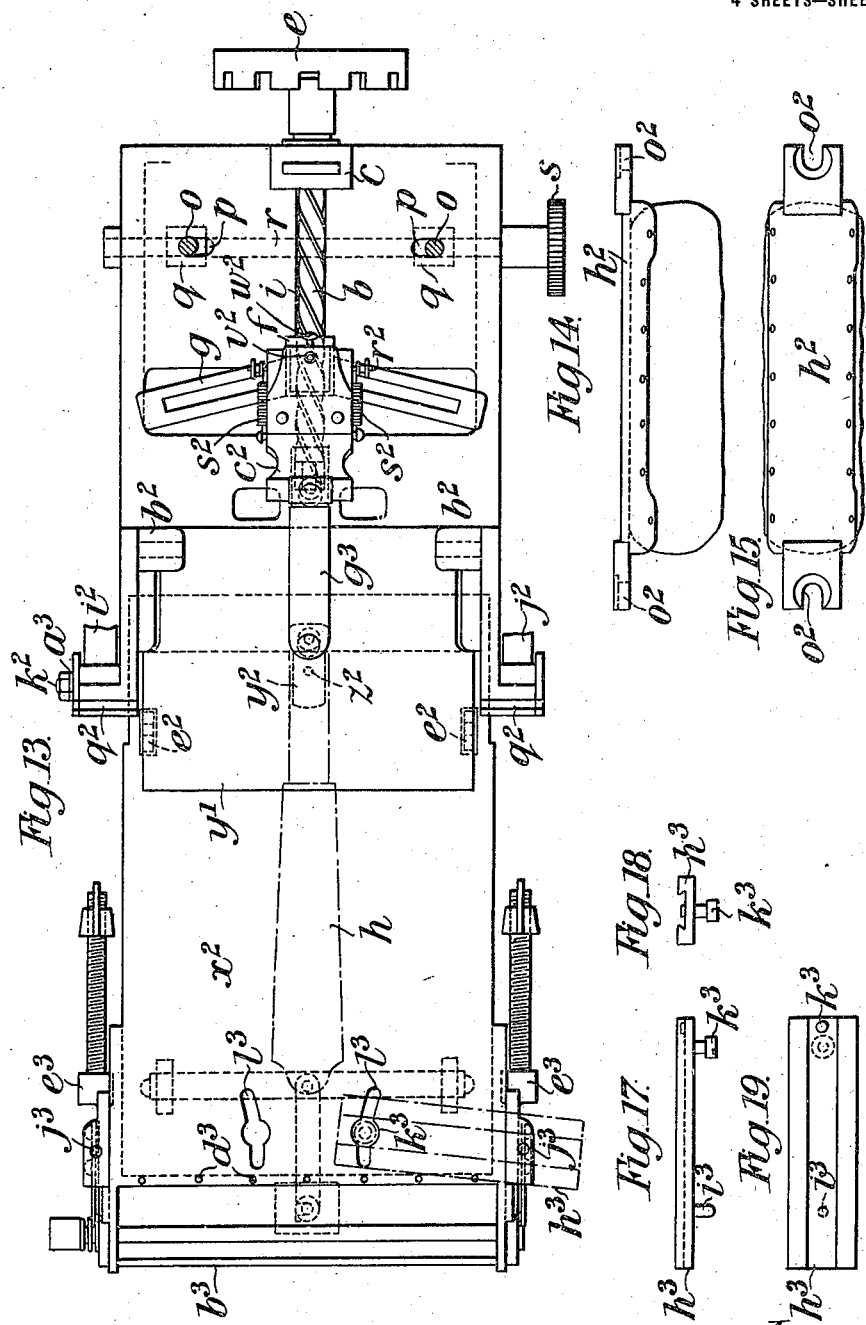

UNITED STATES PATENT OFFICE.

HARRY OSTROVSKY, OF BAYSWATER, LONDON, ENGLAND.

APPARATUS FOR USE BY MUSICIANS FOR PROMOTING THE FLEXIBILITY OF THE JOINTS AND STRETCHING THE MUSCLES AND LIGAMENTS OF THE HANDS.

1,250,636.            Specification of Letters Patent.      Patented Dec. 18, 1917.

Application filed July 19, 1916. Serial No. 110,208.

*To all whom it may concern:*

Be it known that I, HARRY OSTROVSKY, a subject of the Emperor of Russia, residing at 50 Leinster Gardens, Bayswater, London, England, have invented a new and useful improved apparatus for use by musicians for promoting the flexibility of the joints and stretching the muscles and ligaments of the hands, of which the following is a specification.

My invention consists in the novel features hereinafter described, reference being had to the accompanying drawings in which I have shown an embodiment of my invention selected by me for purposes of illustration, and the said invention is fully disclosed in the following description and claims.

Referring to the drawings:—

Figure 1 is a plan of the apparatus without the removable front plate.

Fig. 2 is a longitudinal section and

Fig. 3 is a transverse section of the same.

Fig. 4 is a plan with the finger sockets or stalls removed.

Fig. 5 is a side elevation of one of the finger sockets or stalls.

Fig. 6 is a plan.

Fig. 7 is an end view.

Fig. 8 is a longitudinal section, and

Fig. 9 is an enlarged transverse section of the same.

Figs. 10 and 11 are longitudinal elevations of the inner partial or split tubes.

Fig. 13 is a plan of the same with some of the parts in a different position.

Figs. 14 to 19 are views of details herein after referred to.

Figure 12:
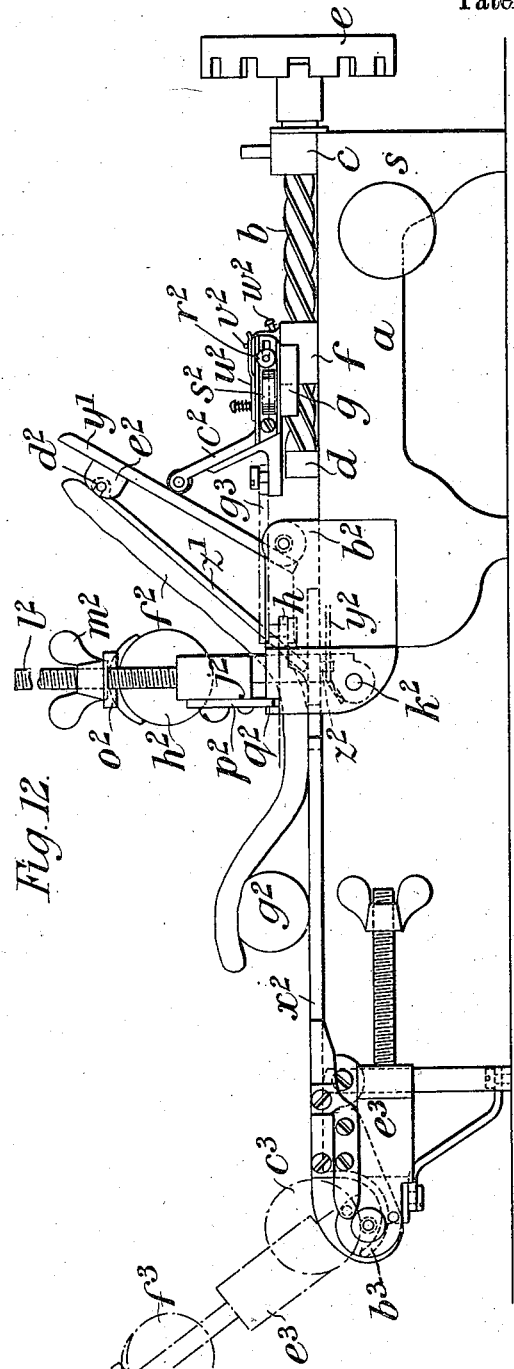
Fig. 12 is a side elevation of the apparatus illustrating its use for pressing back the fingers of the hand.

My invention is designed for use by pianists, violinists and others in whose work hand development and finger dexterity is essential and I have devised my improved apparatus to permit the fingers to be mechanically exercised, with the view of rendering the same supple, by exercising the muscles of the hand, loosening the joints, flexing and extending the membrane and tissue between the fingers, and stretching the fingers.

With the foregoing purposes outlined, and with other objects in view, it will be apparent as the nature of the invention is better understood, that my present invention resides in the combination and arrangement of parts, and in the details hereinafter described. It will be understood that changes in the precise embodiment of the invention herein disclosed may be made within the scope of what is claimed, without departing from the spirit of the invention or sacrificing any of its advantages.

In the drawings $a$ is the frame of the apparatus and $b$ is a longitudinal screw-threaded bar carried in bearings $c$, $d$ on the frame and said bar is provided at its rear end with a notched wheel $e$ which is fixed to said bar and is operated by means of a lever $a^2$ shown in dotted lines in Fig. 2 and detached in Fig. 16. Mounted on the bar $b$ for longitudinal movement is a nut $f$, which carries a transverse bar $g$ and said bar $g$ communicates the movement of the nut $f$ to finger sockets $h$ when producing the lateral stretching or spreading of the fingers, the said nut being guided in a longitudinal slot $i$ in the top of the frame $a$. $j$, $j$ are slots in the bar $g$ and $k$, $k$ are studs on slides $l$ of the finger sockets $h$ over which work the said slots, and $m$, $m$ are guides for the said slides.

The guides $m$ are made in two parts which are hinged together and to the frame at $n$, so that they can open into the dotted position shown in Fig. 4 to allow the finger sockets $h$ to be removed therefrom, and they are also mounted on studs $o$, $o$ moving in slots $p$, $p$ in the top of the frame of the apparatus and carried by nuts $q$, $q$ working along a right and left hand screw $r$ operated by a knob or hand wheel $s$ to allow the angle of the guides $m$ to be varied. The said guides are provided with springs $t$ which always tend to open them, and they are locked in their closed position against the action of the springs $t$ by means of catches $u$, which are pivotally mounted on posts $x$ carried by the stationary part of the guides and are kept in engagement with studs $v$ on the movable part of the guides by springs $w$ that encircle the posts $x$. The catches $u$ can be moved away from the studs $b$ to release the movable portions of the guides by manipulating the angular finger pieces $y$ which are pivoted at $z$ to brackets $a^1$ carried by the said stationary parts of the guides and jointed at $b^1$ to the catches $u$ by pin and slot connections, as shown.

$c^1$ and $d^1$ are the inner, and $e^1$ the outer partial or split conical spring tubes forming the finger sockets or stalls $h$ and $f^1$ is the lining of leather or the like; $g^1$, $g^1$ are the flanges on the free edges of the outer split tube $e^1$, and $h^1$ is the lever for operating on the said edges so as to decrease or increase the sectional area of the split tubes and thereby modify the compression of the fingers in the sockets or stalls $h$. This action of the split tubes is effected through the medium of a grooved cam $i^1$ on the spindle $j^1$ of the lever $h^1$ acting on a rib $k^1$ on the split tube $d^1$ so as to depress the same when the said lever is operated, and of toggle levers or links $l^1$, $l^1$ jointed to the brackets $m^1$, $m^1$ on the flanges $g^1$ of the partial tube $e^1$ and to the rib $k^1$ on the partial tube $d^1$. The lever-spindle $j^1$ is mounted in brackets or bearings $n^1$, $n^1$ which can slide thereon to allow the required lateral movement of the edges of the split tube $e^1$ the extent of which movement outward is limited by a stop-rod $o^1$ carried in brackets $p^1$ on the flanges $g^1$. The said edges are forced outward, against the action of the lever $h^1$ by means of a spring $q^1$ on a rod $r^1$ mounted in brackets $s^1$. The lever $h^1$ is provided with teeth or serrations $t^1$, and an arm $u^1$ is fixed on one end of the rod $r^1$ and has a pin $v^1$ designed to engage the said teeth or serrations in order to lock the lever when it has been moved to the required position.

$w^1$, $w^1$, Fig. 10, indicate the slits in the split or partial tube $d^1$ and $x^1$, $x^1$, Fig. 11, indicate the slits in the split or partial tube $c^1$ whereby elasticity is given to them to enable them to conform to the shape of the fingers when being gripped in the sockets or stalls $h$.

$y^1$, and $z^1$, Fig. 12, are the hinged plates for producing pressure on the back of the hand at the joints, the plate $y^1$ being pivoted to brackets $b^2$ on the top plate or table of the frame $a$; $c^2$ is the bracket carried by the nut $f$ for regulating the angle of the plate $y^1$ with relation to the said top plate. The other plate $z^1$ is provided with lateral studs $d^2$ which can engage notches in brackets $e^2$ on the plate $y^1$ so that the two plates are thus hinged together and the outer or bottom edge of the plate $z^1$ will slide along the top plate of the frame when the plate $y^1$ is moved by the bracket $c^2$ owing to the manipulation of the screw $b$. $f^2$ Fig. 12 is a cushion for the hand and wrist the fingers bearing on the part of the cushion lying against the plate $z^1$ while the palm rests upon the part of the cushion on the top plate and the wrist is on a part of the cushion supported by a pad $g^2$; $h^2$, Figs. 12, 14 and 15 is the padded transverse bar for producing the required pressure on the back of the hand and $i^2$, $j^2$ are the brackets hinged at $k^2$ to the brackets $b^2$ and provided with screw-threaded rods $l^2$ for holding the bar $h^2$ while the said pressure is produced by forcing down the bar by means of the thumb-nuts $m^2$ on the said rods. The bracket $i^2$ in addition to being hinged at $k^2$ to the side of the frame $a$ is made in two parts jointed together at $n^2$ as shown most clearly in Figs. 1 and 4, so that the upper part can be moved outward against the action of a resilient metal strip $a^3$ to quickly release the screw-threaded rod $i^2$ from the recess $o^2$ in the bar $h^2$ in which it is located.

The brackets $i^2$, $j^2$ are designed to lie along the sides of the frame $a$ as shown in Figs. 1 and 4 when not in use and are provided with hinged catches $p^2$ which can be moved into notches $q^2$ in the brackets $b^2$ to secure them when raised into the operative position as shown in Fig. 12.

In order that the bracket $c^2$ may be moved out of the working position shown in Figs. 12 and 13, in which it would interfere with the movement of the finger sockets or stalls $h$ in their guides $m$, it is arranged to turn and slide on a pivot pin $r^2$ upon the nut $f$, so that it can be slid longitudinally against the action of springs $s^2$ to disengage it from a catch $t^2$, Fig. 2, on the nut and then turned from the position shown in Figs. 12 and 13 into the position shown in Figs. 1 to 4; $u^2$ is a spring plate on the bracket $c^2$ having a hole engaging a stud $v^2$ on the nut for preventing the bracket from moving longitudinally when in use, the said plate being designed to similarly engage a stud $w^2$ on the nut to retain the bracket $c^2$ when moved into its other position as shown clearly in Fig. 2.

In Figs. 12 and 13, $x^2$ represents a plate forming a portion of an attachment, which is used with the apparatus when it is desired to stretch a single finger. The plate is provided on its underside near its rear end with a pin or stud $z^2$ which engages a hole in a resilient metal strap $y^2$ secured to the front portion of the frame $a$, when the plate is to be attached to the frame. The front of the plate $x^2$ is provided with a padded bar $b^3$ designed to be engaged by the hand while one of the fingers is being pulled or stretched, the said bar being trough-shaped as shown in dotted lines in Fig. 12 to adapt it to receive the pad $c^3$ thereof which is attached to the plate $x^2$ by means of threads or wires inserted in the holes $d^3$, Fig. 13; $e^2$, $e^3$ are hinged brackets similar to the brackets $i^2$, $j^2$ hereinbefore described and $f^3$ Fig. 12 is a padded bar similar to the bar $h^2$ supported by the said brackets and designed when the brackets are moved into the position shown in dotted lines in Fig. 13 to press upon the back of the hand in order to assist in holding it while the finger is being stretched. To allow of this operation one of the finger sockets or stalls $h$, is shown in dotted lines in Fig. 13, temporarily connected by a link $g^3$ to the brackets $c^2$, the required longitudinal movement of the finger socket or stall being effected by operating the notched wheel $e$ by means of the lever $a^2$ as hereinbefore described.

For holding the thumb while any one of the fingers is being stretched it is clamped in the other finger socket or stall which is temporarily placed in an auxiliary guide $h^3$ (shown in dotted lines in Fig. 13 and also in side elevation, end view and plan at Figs. 17, 18, and 19) oscillating on a pin $i^3$ inserted in a hole $j^3$ in either side of the plate $x^2$ (according to whether the right or the left hand is to be operated upon) and carrying a stud $k^3$ moving in a curved guide-slot $l^3$ on the said plate.

Or instead of placing the thumb in the sliding socket or stall as above described it can be placed under the padded bar $b^3$ in the known manner.

Claims:

1. A device of the class described, comprising a frame, divergent guides mounted on said frame, each of said guides consisting of a fixed part and a movable part hinged together at one end, a latch for holding the free ends of the parts together, finger grasping means slidably mounted in said guides, and means for moving said finger grasping means along said guides.

2. A device of the class described, comprising a frame, divergent guides mounted on said frame, each of said guides consisting of a fixed part and a movable part hinged together at one end, a post carried by the fixed part of the guide and a pin carried by the movable part of the guide, a latch pivotally and slidably mounted on said post and provided with a recess in which the pin rests, a spring for holding the latch in engagement with the pin, means for moving the latch away from the pin to permit the free ends of the guide to be separated, finger grasping means mounted in said guides, and means for moving said finger grasping means along said guides.

3. In a device of the class described, a finger stall comprising an outer split tube, an inner split tube mounted in the outer tube and having its split arranged opposite the split of the outer tube, and means for varying the area of the interior of said tubes to grasp a finger within the same.

4. In a device of the class described, a finger stall comprising an outer split tube, an inner split tube located within the outer tube and having its split disposed opposite the split in the outer tube, said inner tube consisting of two parts, one of which is longitudinally slotted and the other having transverse slits, and means for varying the areas of said tubes to grasp a finger within the same.

5. In a device of the class described, a finger stall comprising a U-shaped flexible member provided on its upper edges with longitudinal plates, a flexible conical split sleeve mounted in said U-shaped member and provided with a cam member for varying the area of the split sleeve, links connecting the longitudinal plates with said cam member, a rock shaft mounted in bearings in said plates and carrying an eccentric which engages said cam member, and a lever rigidly carried by said shaft for turning said eccentric to depress said cam member and cause the split sleeve to contract within said U-shaped member.

6. In an apparatus of the class described, a frame provided with bearings, a longitudinally disposed screw rotatably mounted in said bearings and provided with a notched operating wheel, a nut mounted on said screw and provided with projecting arms provided with longitudinally disposed slots, diagonally disposed guides pivotally connected at one end to said frame, slides movably mounted in said guides and provided with studs which operate in said slots and finger compressing means carried by said slides.

7. In a finger exercising apparatus, a finger stall comprising a shoe carrying a flexible U-shaped member provided at its upper edges with longitudinal plates, apertured ears mounted on said longitudinal plates, rods mounted in said ears, a spring encircling one of said rods for holding the longitudinal plates apart, a conical split sleeve mounted in said U-shaped member and provided with a longitudinally disposed rib, links connecting said plates to said rib, a shaft carried by said plates and provided with an eccentric which is in engagement with said rib for varying the area of said sleeve when the shaft is rotated, a lever rigidly connected with said shaft and provided with a toothed portion, and a catch mounted on one of said rods and having a pin which coöperates with the teeth of the lever for locking the same in various positions.

8. In an apparatus for promoting digital dexterity, a finger bending device comprising a padded bar for clamping a hand to the apparatus frame, a plate pivoted at its lower end to said frame, another plate pivotally connected to the upper end of the first plate, the lower end of which slidably engages the frame, and means for swinging the first plate upon its pivots.

9. In an apparatus for promoting digital dexterity, a frame, a finger bending device comprising a table mounted upon said frame, a plate pivotally connected at its lower end to said frame, another plate pivotally connected to the upper end of the first plate and having its lower end slidably engaging said table, a bar for engaging the back of the hand, and means for swinging the first plate about its pivot whereby said second plate is moved vertically.

10. A device for promoting a digital dexterity comprising a frame having a table, a plate having its lower end pivotally connected to said frame, another plate pivotally connected to the upper end of the first plate and having its lower end resting on said table, a bar mounted above the table for engaging the back of the hand, and a bracket slidably mounted on said table and provided with a roller engaging said first plate.

HARRY OSTROVSKY.

Witnesses:
C. G. REDFERN,
A. ALBRETT.